United States Patent [19]

Holm et al.

[11] Patent Number: 4,714,227
[45] Date of Patent: Dec. 22, 1987

[54] SEAT SUSPENSION FOR AN OFF-ROAD VEHICLE

[75] Inventors: David R. Holm, Oconomowoc; Rudolph A. Peterson, Jr., Horicon, both of Wis.

[73] Assignee: Deere & Company, Moline, Ill.

[21] Appl. No.: 931,286

[22] Filed: Nov. 17, 1986

[51] Int. Cl.⁴ ............................................. F16M 13/00
[52] U.S. Cl. ................................... 248/595; 248/550; 248/573; 267/177; 297/345
[58] Field of Search ............... 248/595, 592, 593, 573, 248/561, 564, 550, 421, 157, 575; 297/307, 345, 338; 267/179, 175, 177, 131, 73; 296/65 R, 63

[56] References Cited

U.S. PATENT DOCUMENTS

| | | | |
|---|---|---|---|
| 2,685,913 | 8/1954 | Schlueter | 248/592 |
| 2,877,825 | 3/1959 | Olson | 248/595 |
| 4,198,092 | 4/1980 | Federspiel | 297/345 X |
| 4,258,896 | 3/1981 | Kato et al. | 248/573 |
| 4,286,765 | 9/1981 | Delgleize et al. | 248/573 |
| 4,382,573 | 5/1983 | Aondetto | 248/588 X |
| 4,384,700 | 5/1983 | Thompson et al. | 248/636 X |
| 4,566,667 | 1/1986 | Yanagisawa | 248/561 |
| 4,640,488 | 2/1987 | Sakamoto | 248/588 |

FOREIGN PATENT DOCUMENTS 2802749  7/1978  Fed. Rep. of Germany ...... 248/595

Primary Examiner—Ramon O. Ramirez

[57] ABSTRACT

An improved seat suspension for reducing the jolt transferred from the seat of a vehicle to an operator when the vehicle "bottoms out". The improved seat suspension consists of a base unit connected to the vehicle, a support unit housing an attenuation unit for attaching the seat to the seat suspension, and a unit for operatively connecting the base and support units. The attenuation unit consists of at least one spring member which is contacted by a bumper attached to the connection unit just prior to the collision of the support unit with the base unit. By the bumper contacting the spring member, the effect of the collision on an operator occupying the seat is reduced.

18 Claims, 5 Drawing Figures

SEAT SUSPENSION FOR AN OFF-ROAD VEHICLE

BACKGROUND OF THE INVENTION

The present invention relates to seat suspension systems and more particularly to an improved seat suspension system, having means for dampening vertical seat movement, for reducing the shock transmitted through the seat to an operator when the seat "bottoms out" when operating an off-road vehicle on bumpy and uneven terrain.

It is known to provide seat suspension systems which dampen vertical seat movement in response to vehicle motion. It is also known and common to provide a fixed amount of vertical dampening.

In off-road vehicles such as lawn and garden tractors, conventional seat suspension system consists of at least one spring between the seat and the tractor for cushioning the force trasmitted to an operator sitting in the seat. Due to space, cost and material limitations, these conventional seat suspensions normally are adjusted and fixed to provide a soft ride on relatively even and non-bumpy terrain. Unless extreme drops or sharp rises were encountered by the vehicle, the operator experienced little discomfort. In instances when the vehicle encountered chuck holes in uneven terrain or curbs, the seat suspension system proved unable to satisfactory prevent substantial vertical movement of the suspension. Sometimes, in fact, this substantial vertical movement caused the seat suspension system to "bottom out" by exceeding the limit of vertical travel therein. The conventional suspension system is unable to satisfactorily absorb the sudden force generated by the "bottoming out" and thus transmitted it through the seat to the vehicle operator resulting in a sudden jolt to the operators body.

In a further effort to reduce some of the sudden force generated by the seat "bottoming out", rubber bumpers were mounted between the vehicle and the seat suspension system, as disclosed in U.S. Pat. No. 4,258,896. While rubber bumpers did some what reduce the sudden jolt associated with "bottoming out" and thus, the shock experienced by the operator, they did not prove to be fully satisfactory.

Additional efforts to solve the "bottoming out" problem resulted in the installation of expensive shock absorbers or other complex hydraulic systems. Examples of such prior seat suspension systems are disclosed in U.S. Pat. Nos. 4,382,573 and 4,384,700. While the shock absorbers and complex hydraulic systems did significantly reduce the shock transmitted to the operator, their installation on small lawn tractors has proved to be unfeasible due to cost and space limitations.

Thus, the vehicle manufacturer has had to compromise his seat suspension design between providing a softer ride during normal vehicle operations relative to reducing the vertical acceleration which resulted in the uncomfortable sudden shock when the seat "bottomed out". Because of the uncomfortable shock experienced by the operator when the seat "bottoms out", attenuation springs were selected which provide a less comfortable ride during normal vehicle operations in order to reduce the uncomfortable sudden shock when the vehicle encountered severe drop offs or rises.

Accordingly, there is a need for an improved seat suspension system for an off-road vehicle such as a small lawn and garden tractor or the like, which significantly reduces the force transmitted to the vehicle operator causing the seat suspension to "bottom out" when encountering bumpy terrain including chuck holes or curbs.

SUMMARY OF THE INVENTION

The present invention is an improved seat suspension system which significantly reduces the force transmitted through the vehicle seat suspension to the operator when an off-road vehicle encounters bumpy and uneven terrain such as chuck holes or curbs.

Specifically, the present invention is an improved seat suspension system consisting of a suspension base unit which is connected to the vehicle, a seat support unit for attaching a seat thereto and housing an attenuation unit, and a connecting unit which connects the base unit to the seat unit and has a bumper member mounted thereon. The reduction in the force transmitted to the opertor is accomplished by providing means for the attenuation unit to be contacted by the bumper just prior to the seat support unit contacting the suspension base unit or just prior to the seat suspension "bottoming out". Specifically, by mounting the bumper on a flange connected to a rotatable connecting member such that the bumper is rotated perpendicular to the spring just prior to the seat support unit contacting the suspension base unit, the force transmitted to an operator occupying the seat is greatly reduced by slowing the relative acceleration of the two units toward each other. This is accomplished by the bumper contacting the elastic spring rather than the seat suspension unit or the suspension base unit as in conventional seat suspension constructions.

In the preferred embodiment, the seat suspension has two adjustable attenuation springs mounted in the seat support unit. A pair of rotatable connecting members are utilized to operatively join the seat support unit and the suspension base unit together. The bumper member is assembled on a flange attached to one of the connecting members such that when a force great enough to "bottom out" the seat suspension system is encountered, a bumper member is rotated perpendicular to each spring and contacts each spring at a predetermined distance prior to the seat support unit colliding with the suspension base unit thereby significantly reducing the force transmitted through the seat to an operator by reducing the closing speed immediately prior to collision between the two units.

The primary objective of this invention, therefore is to provide a seat suspension system which significantly reduces the force transmitted through the vehicle seat to an operator when an off-road vehicle operating on rough terrain encounters a chuck hole or a curb; which provides adequate attenuation or a soft ride during normal operations; which is cost effective for manufacturing since shock absorbers or complex hydraulic system are not required; and which is compact enough to fit within the space alotted the seat suspension system on small lawn and garden tractors.

Other objects and advantages of the present invention will be apparent from the following description, accompanying drawings and the appended claims.

DESCRIPTION OF THE PREFERRED EMBODIMENT

Figure 1:
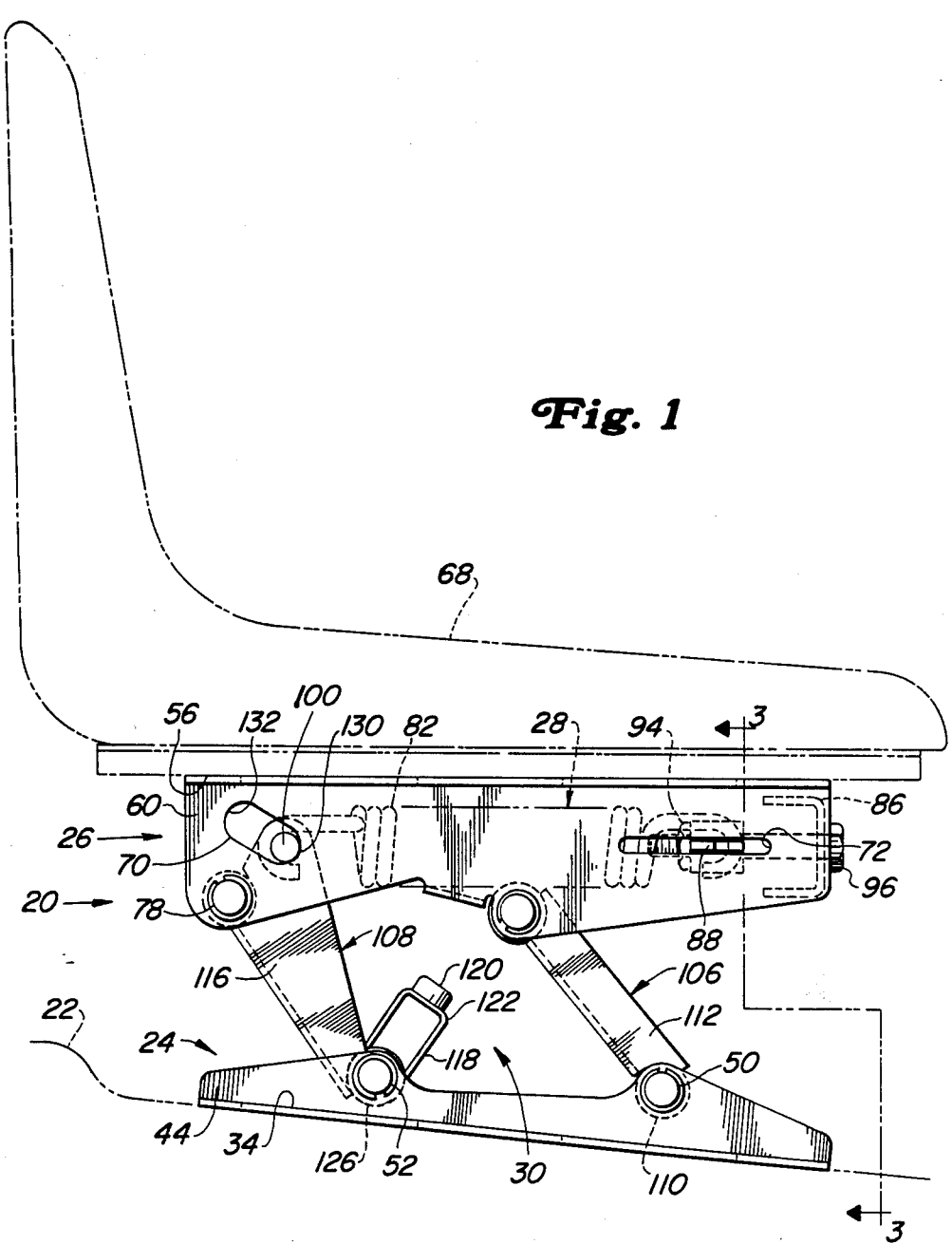
FIG. 1 is a side view illustrating a seat suspension system of the present invention having a seat mounted thereon.

As illustrated in FIG. 1, the preferred embodiment of the present invention, a seat suspension 20 is illustrated attached to a small off-road vehicle such as a lawn tractor 22. The seat suspension 20 consists of four units: a means 24 for attaching the suspension to the tractor itself or suspension base unit; a means 26 for attaching a seat to the seat suspension or a seat suspension unit; a means 28 for attenuating the vibratations resulting from operating the vehicle or an attenuation unit; and a means 30 for operatively connecting the base unit 24 and the seat unit 26 or connecting unit.

Figure 3:
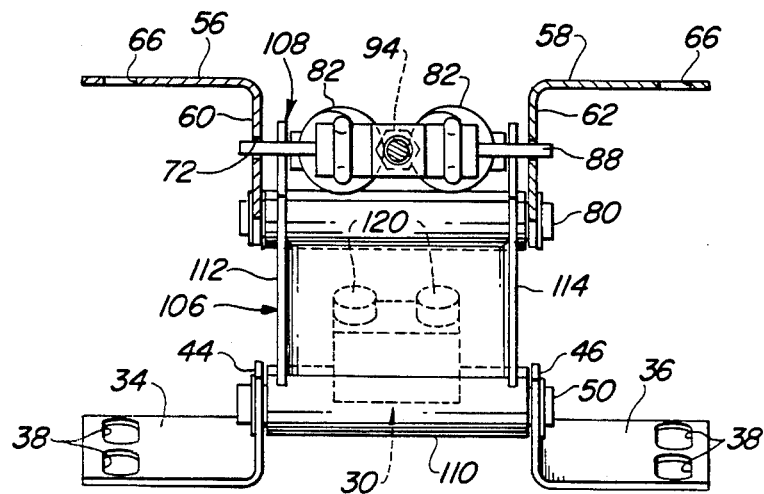
FIG. 3 is an end view of the seat suspension construction system of FIG. 1 taken along line 3—3.

As best shown in FIGS. 1 & 3, the suspension base unit 24 consists of two spaced apart members 34, 36 having apertures 38 formed therein for connecting the base unit 24 to the vehicle. Each of the members 34, 36 has a respective flange 44, 46 each containing two connection points 50, 52 for receiving the connecting unit 30.

Figure 2:
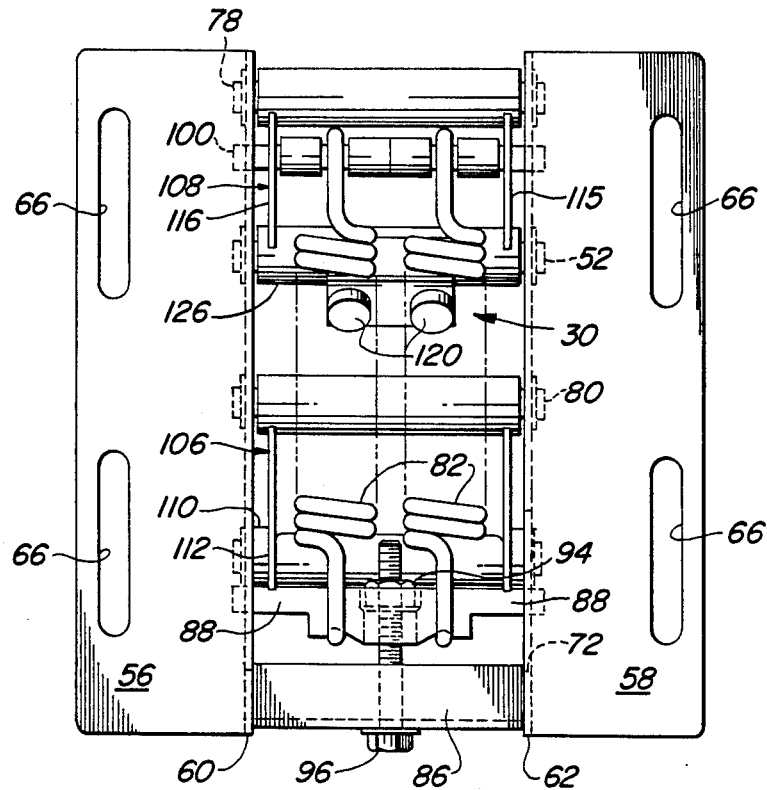
FIG. 2 is a top view of the seat suspension construction of FIG. 1.

As best shown in FIGS. 1-3, the seat suspension unit 26 also consists of two spaced apart members 56, 58 each having respective flanges 60, 62. Each member 56, 58 has a plurality of elongated apertures 66 for connecting a seat 68 thereto. Each flange 60, 62 has a plurality of identical elongated connection points 70, 72, for mounting the vibration attenuation unit 28 therein and two connection points 78, 80 for receiving the connecting unit 30.

The vibration attenuation unit 28 preferably consists of a pair of springs 82 mounted parallel to and between the two seat suspension unit flange members 60, 62. It should be understood that while two springs are illustrated, it is possible that the suspension can be constructed with only one spring or by as many springs as available space will allow.

Additionally, other equivalents may be used in place of the disclosed spring as long as they are capable of providing the resiliency and which are preferably, but not necessarily, adjustable.

The two flange members 60, 62 are operatively connected by a rectangular member 86 at one end such as by welding, by bolts or other conventional means. An adjustable T member 88 is mounted in parallel connection points 72 in each of the flanges 60, 62 and is operatively conventionally connected to the member 86 preferably by a nut 94 and bolt 96 arrangement. At the other end of the flange members 60, 62, a slidable connector 100 is mounted between two connection points 70 in each of the flanges 60, 62.

A pair of springs 82 are conventionally mounted between the T member 88 and the slidable connector 100 and the spring tension is then adjusted by means of the nut and bolt 96 arrangement or other equivalent.

As best shown in FIGS. 1-4, a connecting unit 30, preferably consisting of a pair of connecting members 106, 108 each rotatably connected to each suspension base member 34, 36 and to each of the seat suspension unit member flanges 60, 62 respectively, operatively connect the seat suspension unit 26 and the suspension base unit 24.

The first connecting member 106 consists of a generally U-shaped member having a circular portion 110 connecting the two arms 112, 114 of the U.

Figure 4:
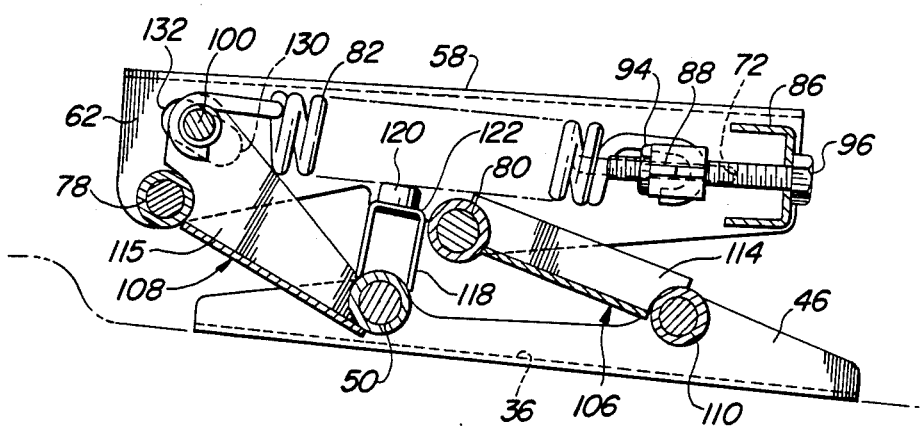
FIG. 4 is a partial side view of the seat suspension system of the present invention just as the bumper contacts the spring.

The second connecting member 108 is similarly constructed with the U-shaped member consisting of two arms 115, 116 and a flange 118 having a pair of bumpers 120 mounted on one surface 122 conventionally attached to the circular portion 126. This flange 118 is operatively connected to the second connecting member 108 so that when the seat suspension unit 26 and the suspension base unit 24 are forced together, the second circular member 108 rotates the flange 118 having the two bumpers 120 into a position perpendicular to the suspension base unit 24, as best shown in FIG. 4, and the two springs 82 such that each of the rubber bumpers 120 directly contacts each of the springs 82 prior to the seat suspension unit 26 and the suspension base unit 24 colliding. Direct contact between the bumper 120 and the spring 82 is made at a predetermined distance between the seat and the base units.

As illustrated in FIG. 1, once assembled to an off-road vehicle, such as a small lawn and garden tractor, the seat suspension 20 is shown in position with the connector 100 being biased toward the lower portion 130 of the elongated connection points 70 in the upper member flange 56. As force is exerted on the seat 68 and transmitted to the seat suspension unit, the seat suspension unit 26 is moved toward the suspension base unit 24 and initially repositions the connector 100 in the upper portion 132 of connection point 70.

During normal off-road operations, the vibration attenuation unit 20 attenuates the forces transmitted through the chassis of the vehicle to the operator by relatively varying the distance between the seat suspension unit 26 and the suspension base unit 24. However, when the vehicle encounters rough terrain having sharp rises or drops such as chuck holes or curbs, the seat suspension has a tendency to "bottom out" i.e. for the seat suspension unit 26 and the suspension base unit 24 to accelerate toward each other and collide. When "bottoming out", as shown in FIG. 4, a sudden jolt is transmitted through the seat to the operator.

With the present invention, as the seat suspension unit 26 and suspension base unit 24 are accelerated together such as when encountering chuck holes or curbs, immediately prior to the seat suspension unit colliding with the suspension base unit, each bumper 120 contacts a respective spring 82 when the two units 26, 24 are a predetermined distance apart, the spring 82 in turn yields, due to its elasticity, thereby deminishing the closing acceleration between the suspension unit 26 and the base unit 24 which has the affect of further attenuating the impact between the two units and thus reducing the sudden jolt transmitted throught the seat suspension to the operator by the collison between the two units as normally occurred when only the connecting bumber members are utilized.

Figure 5:
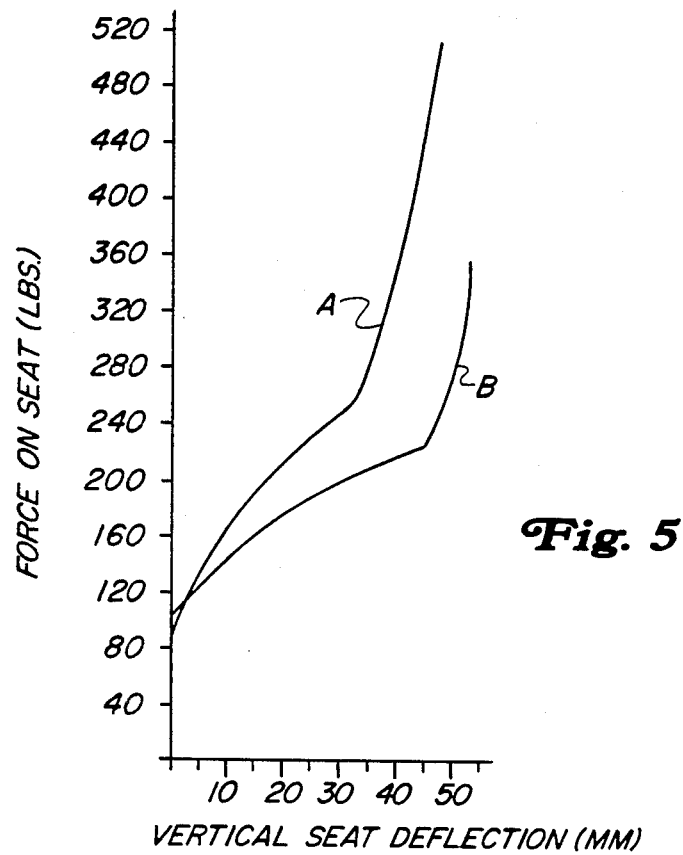
FIG. 5 is a graphic representation illustrating the suddenness and the amount of force transmitted to an operator when a vehicle seat suspension system "bottoms out" utilizing the present invention compared to a conventional small tractor's seat suspension.

As clearly shown in FIG. 5, the force required to "bottom out" the suspension is much greater with the present invention, illustrated by line A, than with the prior seat suspensions illustrated by line B.

While the form of apparatus herein described constitute a preferred embodiment of this invention, it is to be understood that the invention is not limited to this precise form of apparatus and that changes may be made therein without departing from the scope of the invention which is defined in the appended claims.

We claim:

1. A seat suspension system for an off-road vehicle comprising:
   means for connecting said suspension to said vehicle;
   means, operatively connected to said suspension connection means, for connecting a seat to said suspension;
   means, operatively connected to said seat connection means, for attenuating the acceleration of said seat connection means toward said suspension connection means; and
   means, operatively connected to said suspension connection means, for directly contacting said attenuation means prior to said suspension connection means and said seat connection means colliding thereby reducing the sudden jerk produced by said collision.

2. The seat suspension system of claim 1 wherein said suspension connection means further comprises:
   a first pair of operatively connected members each having flanges and apertures formed therein.

3. The seat suspension system of claim 1 wherein said seat connection means further comprises:
   a second pair of operatively connected members each having means fir attaching a seat thereto.

4. The seat suspension system of claim 3 wherein said second pair of members are connected by a rectangular member at one end and a slidable member at the other end.

5. The seat suspension system of claim 1 wherein said attenuation means further comprises:
   at least one resilient means operatively mounted to said second pair of members.

6. A seat suspension for an off-road vehicle comprising:
   a suspension base unit for operatively attaching said suspension to said vehicle;
   a seat suspension unit for operatively attaching a seat thereto;
   at least one spring member operatively positioned in said suspension unit for attenuating the vertical acceleration of said seat suspension unit toward said suspension base unit;
   at least one connecting unit, pivotable between a first position separating said seat sususpension unit and said base unit and a second position in which said seat suspension unit contacts said suspension base unit, for operatively connecting said suspension base unit and said seat suspension unit; and
   a bumper, operatively connected to said connecting unit, for directly contacting said spring just prior to said seat suspension unit colliding with said suspension base unit such that the sudden force normally transmitted to said seat when said seat suspension unit and said suspension base unit collide is significantly reduced by said direct contact between said bumper and said spring member.

7. The seat suspension system of claim 6 wherein said suspension base unit further comprises:
   a first pair of operatively connected members each having flanges and apertures formed therein.

8. The seat suspension system of claim 6 wherein said seat suspension unit further comprises:
   a second pair of operatively connected members each having means for attaching a seat thereto.

9. The seat suspension system of claim 6 wherein said bumper directly contacts said spring member at a point intermediate the length of said spring such that the resiliency of said spring significantly reduces said sudden force normally transmitted to said seat when said seat suspension unit and said suspension base unit collide.

10. A seat suspension system for an off road vehicle comprising:
    a first pair of operatively connected members each having flanges and apertures formed therein;
    a second pair of members each having means for attaching a seat thereto and being operatively connected by a rectangular member at one end and a slidable member at the other end;
    means, operatively connected to said second pair of members, for attenuating the acceleration of said second pair of members towards said first pair of members; and
    means, operatively connected to said first pair of members, for contacting said attenuation means prior to said first pair of members and said second pair of members colliding thereby reducing the sudden jerk produced by said collision.

11. The seat suspension system of claim 10 wherein said attenuation means further comprises:
    at least one spring operatively mounted in said second pair of members.

12. The seat suspension system of claim 11 wherein said spring is operatively mounted between said rectangular member and said slidable member parallel to said second pair of members.

13. The seat suspension of claim 12 wherein the tension of said spring is adjustable.

14. The seat suspension of claim 11 wherein said attenuation contacting means furter comprises:
    at least one connecting unit rotatably connecting said first and said second pair of members; and
    at least one bumper operatively attached to said connecting member such that when said first pair of members and said second pair of members are vertically accelerated together, said bumper directly contacts said spring prior to said members colliding.

15. The seat suspension of claim 14 wherein when said bumper contacts said spring, the sudden jerk produced thereby is reduced by the elastic response of said spring to the direct contact with said bumper prior to the direct contact between said suspension connection means and said seat connection means.

16. The seat suspension system of claim 11 wherein said resilient means is adjustable.

17. The seat suspension system of claim 14 wherein said bumper directly contacts said spring at a point intermediate the length of said spring.

18. A seat suspension system comprising:
    a first pair of operatively connected members each having flanges and apertures formed therein for operatively attaching said seat suspension system to a vehicle;
    a second pair of operatively connected members each having means for operatively attaching a seat to said seat suspension system;

at least one resilient member, operatively connected to said second pair of operatively connected members, for attenuating the relative vertical acceleration of said second pair of members towards said first pair of members;

a pivotable connecting unit, movable between a first position separating said second pair of members and said first pair of members and a second position in which said first and said second pair of members are in direct contact; and a contact unit, operatively connected to said connecting unit, for rotating into direct contact with said resilient member at a point intermediate the ends thereof just prior to said first and said second pair of members colliding, said contacts between said resilient member and said contact unit significantly reducing the sudden force normally transmitted to said seat during said collision.

* * * * *

UNITED STATES PATENT AND TRADEMARK OFFICE
CERTIFICATE OF CORRECTION

PATENT NO. : 4,714,227

DATED : 22 December 1987

INVENTOR(S) : David R. Holm and Rudolph A. Peterson Jr.

It is certified that error appears in the above-identified patent and that said Letters Patent is hereby corrected as shown below:

In claim 3, line 4, delete "fir" and insert therefor -- for -- .

In claim 14, line 2, delete "furter" and insert therefor -- further -- .

Signed and Sealed this

Ninth Day of August, 1988

Attest:

DONALD J. QUIGG

*Attesting Officer*　　　　　*Commissioner of Patents and Trademarks*